US009645618B2

(12) United States Patent
Cavallaro et al.

(10) Patent No.: US 9,645,618 B2
(45) Date of Patent: May 9, 2017

(54) SKIN OSCILLATION CONVECTIVE COOLING

(71) Applicant: Google Technology Holdings LLC, Mountain View, CA (US)

(72) Inventors: Alberto R. Cavallaro, Northbrook, IL (US); Morris B. Bowers, Grayslake, IL (US); Paul B. Crosbie, Grayslake, IL (US); Martin R. Pais, North Barrington, IL (US); Maninder S. Sehmbey, Hoffman Estates, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 461 days.

(21) Appl. No.: 14/447,731

(22) Filed: Jul. 31, 2014

(65) Prior Publication Data
US 2016/0037675 A1 Feb. 4, 2016

(51) Int. Cl.
*G06F 1/20* (2006.01)
(52) U.S. Cl.
CPC .................................. *G06F 1/20* (2013.01)
(58) Field of Classification Search
USPC .................................................. 361/679.46
See application file for complete search history.

(56) References Cited

U.S. PATENT DOCUMENTS

| 5,914,856 A * | 6/1999 | Morton .............. H05K 7/20172 165/165 |
| 6,181,555 B1 * | 1/2001 | Haley .................. G06F 1/1616 361/679.21 |
| 7,187,545 B2 * | 3/2007 | Exel .................... H01L 23/3735 165/80.5 |
| 7,553,135 B2 * | 6/2009 | Cho ...................... F04B 43/046 361/688 |
| 8,721,303 B2 | 5/2014 | Fujisaki et al. |
| 2014/0268545 A1 * | 9/2014 | Mahalingam .......... G06F 1/203 361/679.47 |
| 2016/0237999 A1 * | 8/2016 | Cordatos ............... F04B 19/006 |

* cited by examiner

*Primary Examiner* — Rodney Fuller
(74) *Attorney, Agent, or Firm* — Faegre Baker Daniels LLP

(57) ABSTRACT

An electronic device has a housing, at least one actuator attached to the housing, and a deformable skin having air pores. The actuators are attached to both the housing and the deformable skin to impart a motion that causes a varying amount of separation. A thermal exchange cavity is defined by the housing and the deformable skin. A skin oscillation controller is contained with the housing and is electrically connected to the at least one actuators that vary a volume of the thermal exchange cavity by deforming the deformable skin, causing an exchange of ambient air through the air pores to convectively cool the housing.

20 Claims, 6 Drawing Sheets

SKIN OSCILLATION CONVECTIVE COOLING

BACKGROUND

1. Technical Field

The present disclosure generally relates to electronic devices, and more particularly to cooling electronic devices.

2. Description of the Related Art

Mobile devices such as cellular telephones, smart phones, and other handheld or user electronic devices such as personal digital assistants (PDAs), headsets, MP3 players, etc. have become popular and ubiquitous. As more and more features have been added to mobile devices, there has been an increasing desire to equip these mobile devices with input/output mechanisms that accommodate numerous user commands and/or react to numerous user behaviors. For example, many mobile devices are now equipped not only with buttons or keys/keypads, but also with capacitive touch screens by which a user is able to communicate to the mobile device a variety of messages or instructions, simply by touching the surface of the mobile device and/or moving the user's finger along the surface of the mobile device.

Mobile electronic devices are incorporating processors that operate at higher speeds, have more sensors, have higher-bandwidth functionality, and include larger displays. In support of this higher performance, electronic devices are expected to dissipate increased amounts of thermal energy. In mobiles, a thermal resistance network to dissipate the heat is greatly restricted by the outer surface area available and the limited surrounding air movement under a natural convection regime. Convection (i.e., movement of heat by air-velocity) can be drastically improved with air movers, but solutions that entail traditional fans add significant volume and do not integrate in the form factor of a current mobile electronic device. Similarly, surface area can be increased with fins, but again this would increase the overall volume of the mobile and give an undesirable industrial look. The application of thermal mitigation techniques for mobiles needs special consideration to enhance heat transfer to the environment by integrating a solution that does not impact the overall system design.

BRIEF DESCRIPTION OF THE DRAWINGS

The description of the illustrative embodiments is to be read in conjunction with the accompanying drawings, wherein.

DETAILED DESCRIPTION

Figure 1:
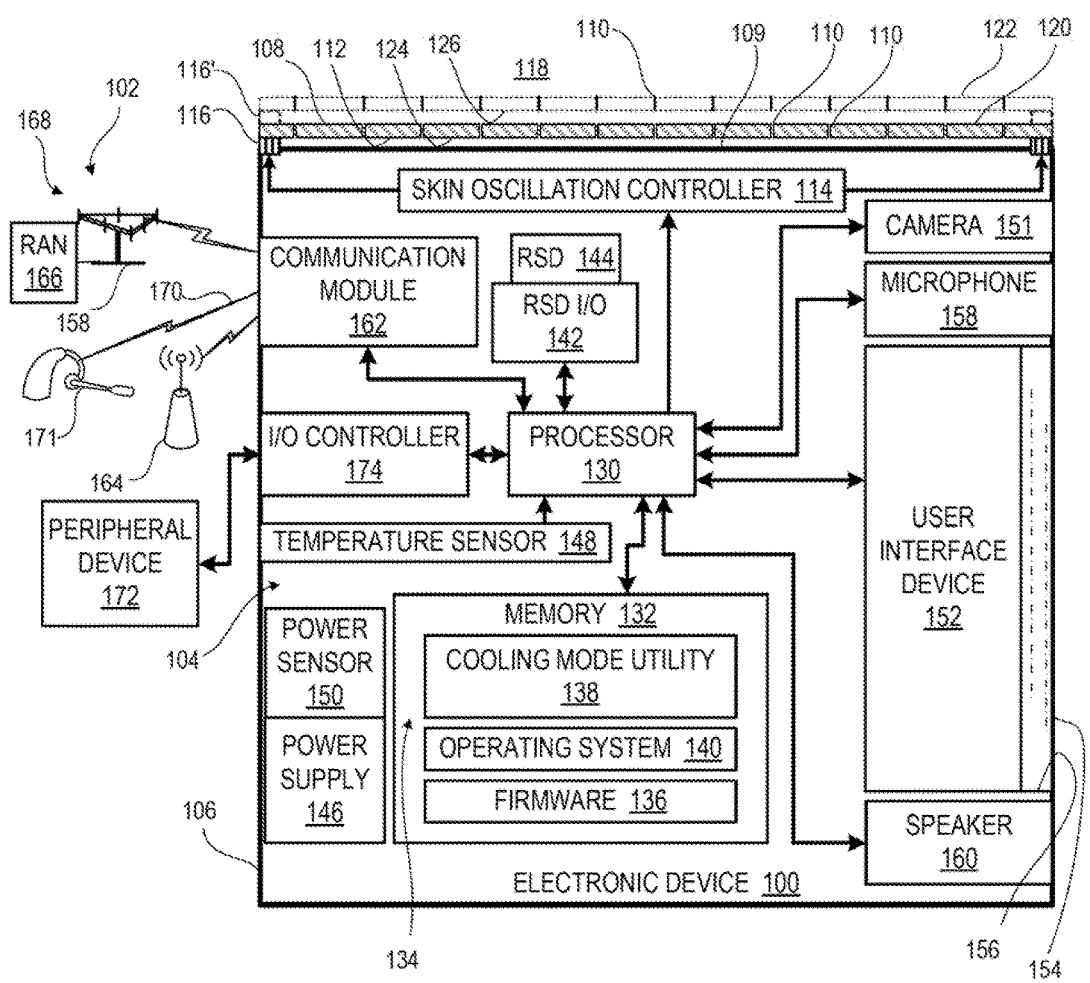
FIG. 1 illustrates a block diagram of an example electronic device having a deformable skin for cooling a housing, according to one or more embodiments.

The illustrative embodiments of the present disclosure provide an electronic device having: a housing with at least one actuator attached to the housing; and a deformable skin having air pores and attached to the at least one actuator. A thermal exchange cavity is defined by the housing and the deformable skin. A skin oscillation controller is contained within the housing and is electrically connected to the at least one actuator. The actuators, in response to the skin oscillation controller, vary a volume of the thermal exchange cavity by deforming the deformable skin to exchange ambient air through the air pores in order to convectively cool the housing and, by extension, cool internal components of the electronic device.

In one or more embodiments of the present disclosure, a method includes conducting thermal energy through a housing of an electronic device. The housing is attached to at least one actuator and is covered by a deformable skin having air pores. A volume between the housing and the deformable skin defines a thermal exchange cavity. The method further includes controlling the actuators to vary the volume of the thermal exchange cavity by deforming the deformable skin. The deformations cause an oscillation that exchanges ambient air through the air pores and convectively cools the housing and thus the electronic device.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention.

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein.

Turning now to FIG. 1, there is depicted a block diagram representation of an example electronic device 100 within which several of the features of the disclosure can be implemented. In an exemplary aspect, the electronic device 100 includes the hardware and software to support the various wireless or wired communication functions as part of a communication system 102. The electronic device 100 can be one of a host of different types of devices, including but not limited to, a mobile cellular phone or smart-phone, a laptop, a net-book, an ultra-book, and/or a tablet computing device. The electronic device 100 may be portable or fixed. For clarity, according to the general illustration, the electronic device 100 includes electronic components 104 that dissipate thermal energy generated by the electronic device 100. A housing 106 of the electronic device 100 protects these electronic components 104 by substantially or entirely sealing the electronic components 104 from the ambient environment. According to one aspect, the electronic device 100 can also include a deformable skin 108 over portions of the housing 106. The deformable skin 108 can have insulative properties that can further impede cooling. To increase dissipation of thermal energy, the deformable skin 108 has air pores 110 that communicate with a thermal exchange cavity 112 defined by an enclosed surface 109, the housing 106, and the deformable skin 108. A skin oscillation controller 114 is electrically connected to actuators 116 that oscillate the deformable skin 108. The actuators 116 vary a volume of the thermal exchange cavity 112 by deforming the deformable skin 108 for exchanging ambient air 118 through the air pores 110 to convectively cool the housing 106.

Actuators 116 can include one or more types of electrically-responsive actuators, thermal actuators, electromechanical actuators, electromagnetic actuators, pneumatic actuators, or hydraulic actuators. The actuators 116 can impart one or more motions to the deformable skin 108 to include a bending, raising, stretching, contracting, or repulsing. For clarity, the actuator 116 is depicted as linearly expanding to an increased height actuator 116'. A repulsion type of actuator 116 can include an electrostatic actuator. Other examples of actuators 116 further include piezoelectric actuators, pneumatic motors, linear motors, and rotary motors. The actuators 116 impart a motion that stretches, bends, or raises portions of the deformable skin 108 from a relaxed position 120 to an elevated, actuated position 122. The thermal exchange cavity 112 changes from a smaller volume 124 to an expanded volume 126. For example, the smaller volume 124 can be close to zero. Ambient air 118 is inhaled and exhaled during a duty cycle of the actuators 116 to accentuate convective cooling of the housing 106 and thus the electronic components 104 of the electronic device 100.

The deformable skin 108 can be selected to respond to the type of motion imparted by the actuators 116. For example, passive components can be included in the deformable skin 108 that accentuate the rigidity, shape, or thermal conductivity. For example, a bimetallic skin (FIGS. 6-8) curls in response to an elevated temperature. Deformable skin 108 can be any plastic, ceramic, composite, or metal of thicknesses as limited by manufacturing processes. For example, a deformable skin 108 can be an aesthetically printed plastic of 0.5 mm in thickness with air pores 110 of 4 mm diameter at a pitch spacing of 10 mm. It is further contemplated that a pitch to diameter ratio can be 2 to 5. In an exemplary embodiment, the pitch to diameter ratio is 2:5.

To determine a resulting effect of a single air pore 110 and symmetry cell, a thermal analysis was performed for the following structure:

0.0265 W/cm2~5 W for 135×70 mm product on 2 surfaces
D 4 mm pore/0.5 mm gap/5 mm/s velocity
Front wall h=5 W/m2-K
Temperature differential (DT) between internal housing and ambient environment=51−22=29C
h_eff=265/29=12 W/m2K As a control, a structure with no moving wall was analyzed for h=5 W/m2-K with a resulting DT=77−22=55C. Thus, low airflow with actuating surface at 5 mm/sec at average 0.5 mm gap shows improvement of DT from 55° C. to 29° C.

Structural analysis for skin actuation from embodiment was performed for actuators that imparted a 0.04 mm displacement at the corner inward. The deformable skin was representative of a 0.5 mm PC layer over a 135×70 mm region. Resulting displacement is amplified at center and creates a 1 mm gap at the center, as desired for the proposed airflow. As a first order estimate, actuation requires a total force over the length of the deformable skin of 0.4 N. The work required over a 0.04 mm actuation at 0.4 N during both an up portion and down portion of a duty cycle yields an energy consumption of 64 uJ per duty cycle. Over a 10 minute period, when performing the heat transfer calculations at 2.5 Hz, the energy used (not accounting for circuit and piezo efficiency) is only 96 mJ. An electrical to mechanical efficiency for a piezo-actuator of 3% for this operating condition and a 3.6 V drive draws currents of 180 uA.

Referring now to the specific component makeup and the associated functionality of the presented components, the electronic device 100 can include an integrated circuit (IC) processor 130, which connects, via a plurality of bus interconnects (illustrated by the bi-directional arrows), to a plurality of functional components of the electronic device 100. Processor 130 can include one or more programmable microprocessors, such as a data processor and a digital signal processor (DSP), which may both be integrated into a single processing device, in some embodiments. The processor 130 controls the communication, user interface, and other functions and/or operations of the electronic device 100. These functions and/or operations thus include, but are not limited to, application data processing and signal processing. The present innovation can be implemented using hardware component equivalents such as special purpose hardware, dedicated processors, general purpose computers, microprocessor-based computers, micro-controllers, optical computers, analog computers, dedicated processors and/or dedicated hard wired logic. Connected to processor 130 is memory 132, which can include volatile memory and/or non-volatile memory that store software code such as a software 134 and/or firmware 136. One or more executable applications can be stored within memory 132 for execution by the processor 130. For example, memory 132 is illustrated as containing a cooling mode utility 138 and an operating system 140. The memory 132 may be augmented by data storage, illustrated as a removable storage device (RSD) input/output (I/O) interface 142 that receives a RSD 144.

In one embodiment, the cooling mode utility 138 is executed by the processor 130 and can change operating modes of the skin oscillation controller 114 in response to different operating modes or conditions of the electronic device 100. In other embodiments, the skin oscillation controller 114 can operate autonomously of the processor 130. For example, portions of the electronic device 100 can be turned off or intermittently turned off in order. In addition to conserving charge of a power supply 146, such partial shutdowns mitigate an over-temperature condition. Convective cooling by the skin oscillation controller 114 can still be commanded in this instance to lower an over-temperature condition. Temperature can be directly or indirectly detected by a temperature sensor 148 and/or a power consumption sensor 150. In one embodiment, the skin oscillation controller 114 is communicatively coupled to the temperature sensor 148. The skin oscillation controller 114 changes a duty cycle of actuators 116, varying the volume of the thermal exchange cavity 112 in response to a temperature value sensed by the temperature sensor 148. In one embodiment, the skin oscillation controller 114 is communicatively coupled to the power consumption sensor 150. The skin oscillation controller 114 changes a duty cycle of actuators 116, varying the volume of the thermal exchange cavity 112 in response to a power consumption value sensed by the power consumption sensor 150.

In one embodiment, the housing 106 of the user device 100 supports and protects the aforementioned electronic components while facilitating interactions with a user. For example, the electronic device 100 may include a camera 151 that captures images. At least one user interface (UI) device 152 is presented through a transparent cover 154 attached across an opening 156 in the housing 106. For clarity the UI device 152 is a touch screen device. Other embodiments of the electronic device 100 may include UI devices such as touch pads, graphical or alphanumeric displays, keypads, or haptic devices. The electronic device 100 may include audio devices such as a microphone 158 and a speaker 160. In other embodiments, an electronic device 100 that operates without direct user interaction can also benefit from convective cooling.

In an exemplary embodiment, the electronic device 100 supports wireless communication via a communication module 162. For example, the electronic device 100 may support communication protocols and transceiver radio frequencies appropriate for one or more of a wireless local area network (WLAN), illustrated as a node 164, a radio access network (RAN) 166 of a wireless wide area network (WWAN) or cellular network 168, and a near field or personal access network (PAN) 170 to a wireless accessory 171. In certain embodiments, the electronic device 100 may also support a hardwired local access network (LAN) or peripheral devices 172 via an I/O controller 174.

Figure 2:
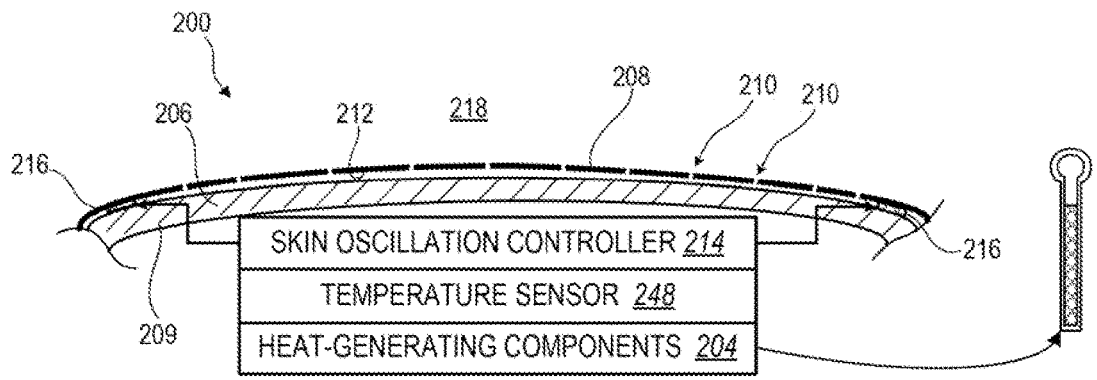
FIG. 2 illustrates a side view of a portion of the example electronic device with the deformable skin in an initial, contracted state, according to one embodiment.
Figure 3:
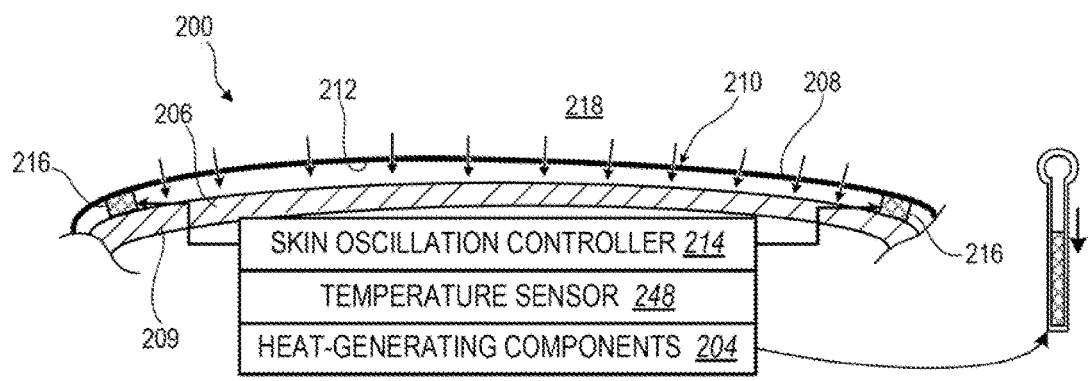
FIG. 3 illustrates a side view of the portion of the example electronic device of FIG. 2 with the deformable skin in an expanded state, according to one embodiment.
Figure 4:
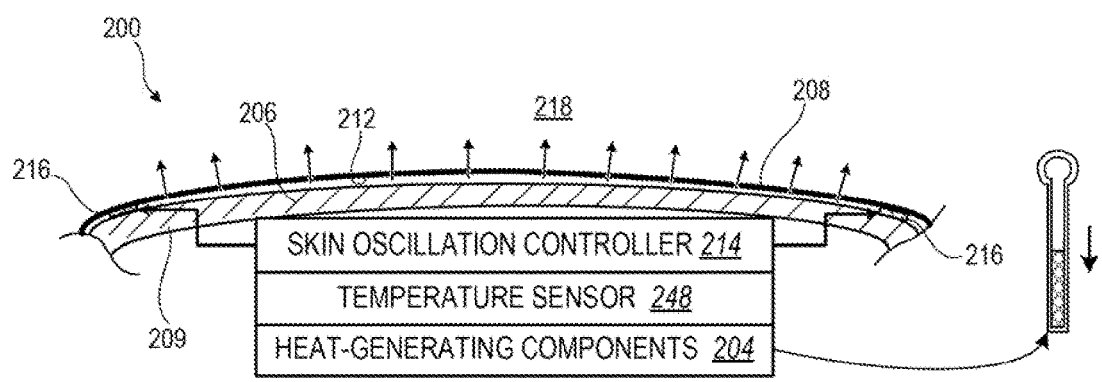
FIG. 4 illustrates a side view of the portion of the example electronic device of FIG. 2 with the deformable skin in the contracted state, according to one embodiment.

FIGS. 2-4 illustrate an electronic device 200 having electronic components 204 that are heat generating. A temperature sensor 248 detects the temperature of the electronic components 204. FIG. 2 illustrates in an initial, relaxed state a deformable skin 208 that covers an enclosed surface 209 of a housing 206 of the electronic device 200. FIG. 3 illustrates a skin oscillation controller 214 that causes actuators 216 to raise, bend, stretch or compress a deformable skin 208, expanding a volume of a thermal exchange cavity 212 defined between the enclosed surface 209 and the deformable skin 208. Ambient air 218 is sucked into the thermal exchange cavity 212 through air pores 210. FIG. 4 illustrates the end of a duty cycle of the actuators 216 as the actuators 216 return to a relaxed state allowing the deformable skin 208 to resiliently return the thermal exchange cavity 212 to a reduced volume.

Figure 5:
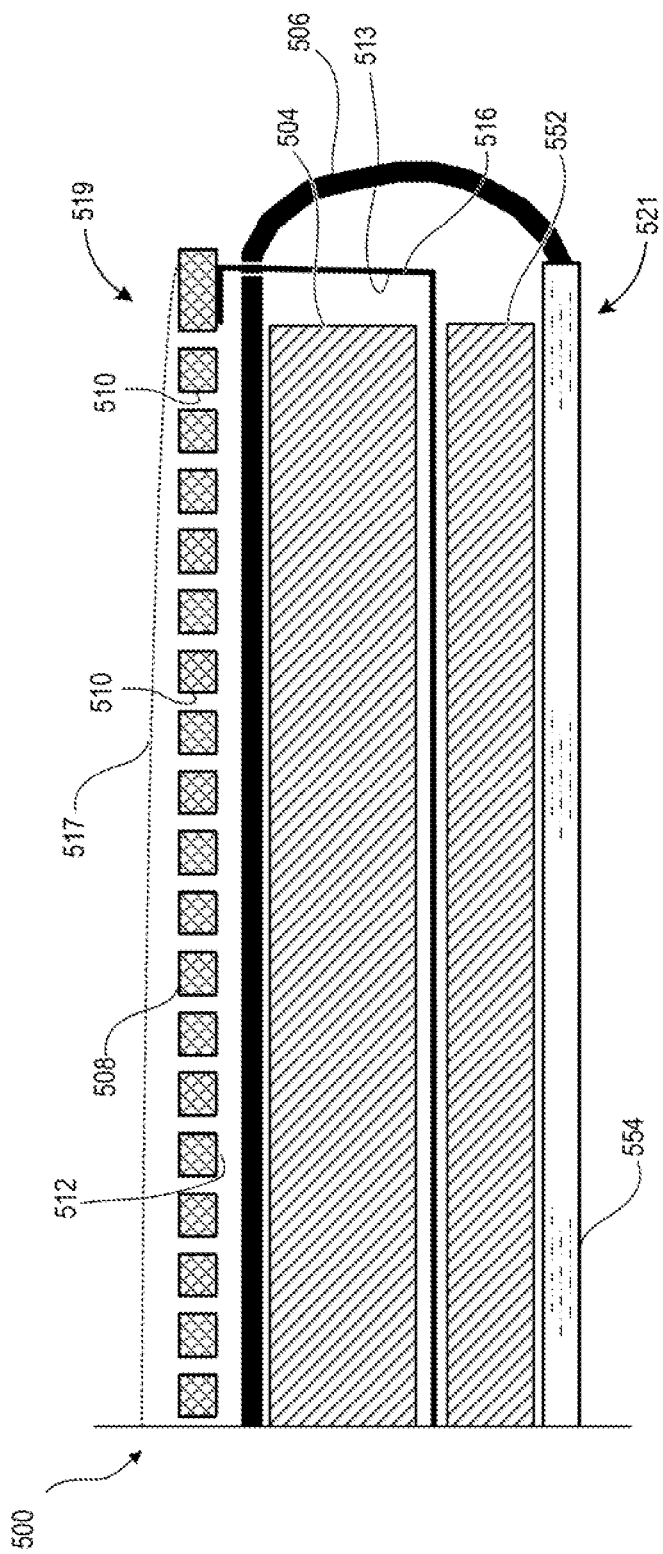
FIG. 5 illustrates a side view of the portion of an example electronic device with the deformable skin edge actuated by a piezoelectric actuator, according to one embodiment.

FIG. 5 illustrates an example electronic device 500 with a deformable skin 508 that is edge supported and actuated by piezoelectric actuators 516. Positions of the actuators 516 can be selected at harmonic nodes and antinodes of the deformable skin 508 to cause localized oscillations 517 in the deformable skin 508 that vary a thermal exchange cavity 512. For example, the piezoelectric actuators 516 can be positioned with respect to the deformable skin 508 to cause convective cooling by acoustically oscillating a transparent cover 554 over a display. In an exemplary embodiment, a wave form for oscillations is selected for effective convective cooling and to remain below an audible range such as being below 20 Hz. A housing 506 could fully enclose the electronics to protect the electronic components 504 from environmental exposure, although an open system in the rear can be included in certain embodiments. Piezoelectric actuation mechanisms can be integrated with an internal chassis 513 and interposed between an enclosed portion and the deformable skin 508. The internal chassis 513 can support and protect a battery and computing components, for example. In the exemplary embodiment, the deformable skin 508 covers a back side 519 of the electronic device 500. A front side 521 includes a transparent cover 554 over an UI device 552. Actuators 516 can be attached to other portions of the housing 506 as well, in one or more embodiments.

Figure 6:
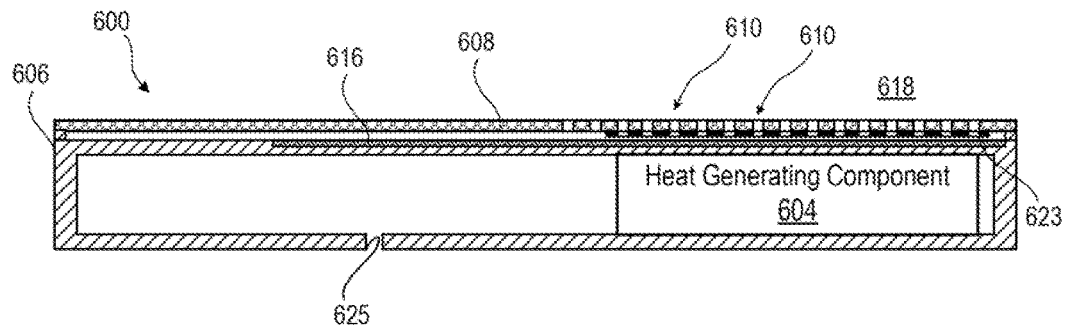
FIG. 6 illustrates a side view of a portion of another example electronic device with electrostatic actuation and with the deformable skin in an initial, contracted state and including a bimetallic strip that passively responds to temperature, according to one embodiment.
Figure 7:
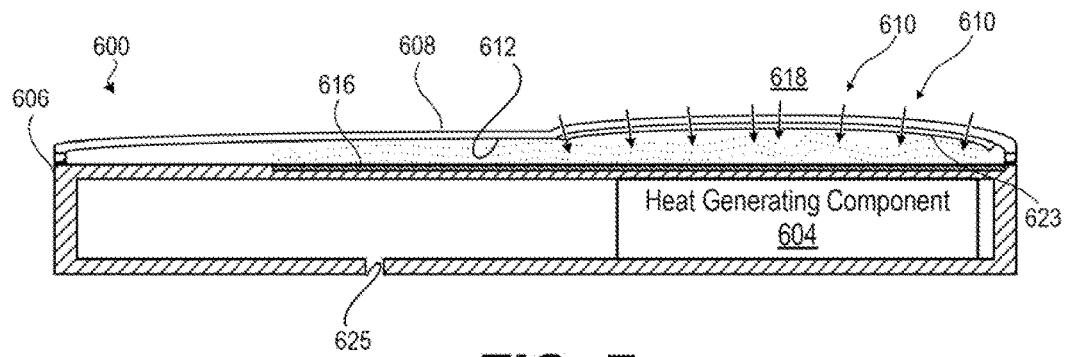
FIG. 7 illustrates a side view of the portion of the other example electronic device of FIG. 6 with the deformable skin in an expanded state, according to one embodiment.
Figure 8:
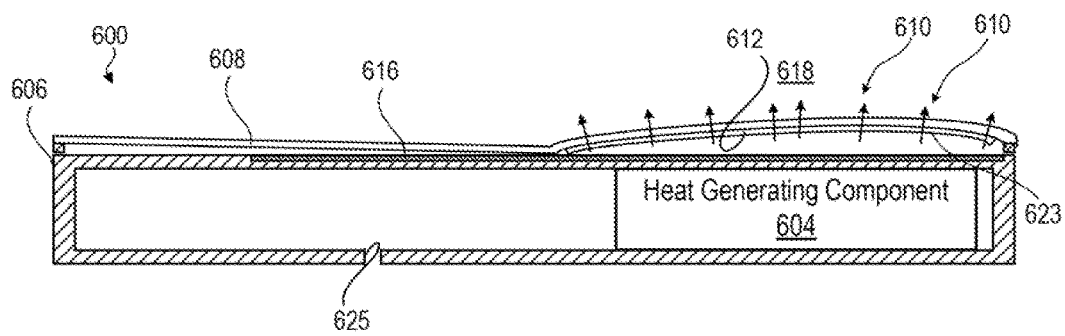
FIG. 8 illustrates a side view of the portion of the example electronic device of FIG. 6 with the deformable skin in the contracted state, according to one embodiment.

FIGS. 6-8 illustrate another example electronic device 600 having an electronic component 604 that requires convective cooling in a localized, contiguous area of a housing 606. Actuators 616 that electrostatically repulse a deformable skin 608 cause variations in volume of a thermal exchange cavity 612. The deformable skin 608 includes a bimetallic strip 623 that causes a localized curling in the deformable skin 608 to attenuate the thermal exchange cavity 612 for convective cooling. The housing 606 is effectively sealed with regard to convectively cooling the electronic component 604, although the housing 606 includes an aperture 625. FIG. 6 illustrates the deformable skin 608 in a relaxed state, including the bimetallic strip 623 that is flat. FIG. 7 illustrates with the deformable skin 608 both electrostatically actuated by actuators 616 and thermally actuated by the bimetallic strip 623 to increase the thermal exchange cavity, pulling in ambient air 618. FIG. 8 illustrates the actuators 616 allowing the deformable skin 608 to relax with the bimetallic strip 623 remaining curled. Air pores 610 can be limited to an area of the deformable skin 608 over the electronic component 604 to cause greater air flow exchange in this area.

Figure 9:
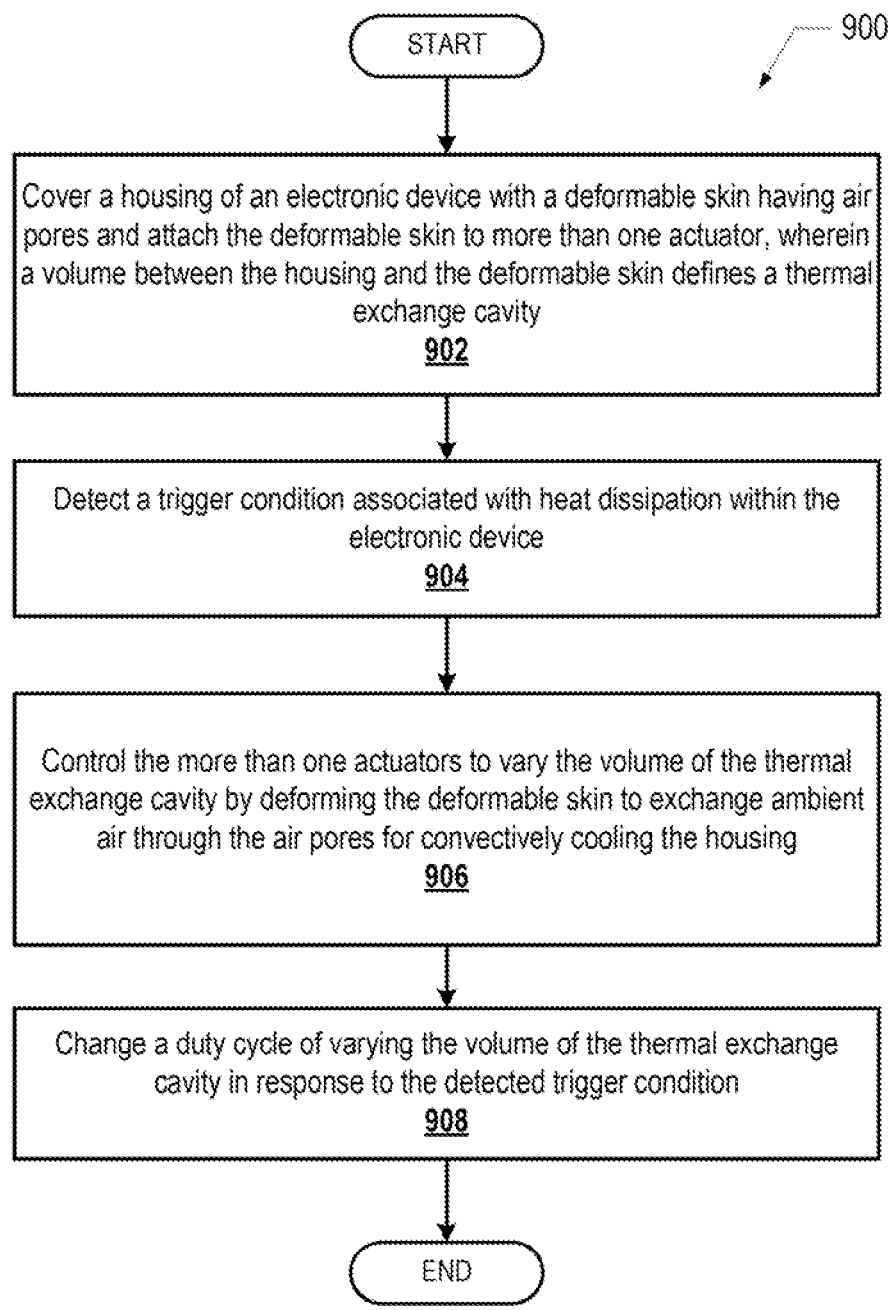
FIG. 9 illustrates a flow diagram of a method of actuating a deformable skin to convectively cool a housing of an electronic device, according to one embodiment.

FIG. 9 illustrates an example method 900 for convectively cooling at least a portion of a housing of an electronic device. Method 900 begins at start block. In one embodiment, the method 900 conducts thermal energy through a housing of an electronic device. The method includes covering the housing with a deformable skin having air pores and attached to at least one actuator (block 902). A volume between the housing and the deformable skin defines a thermal exchange cavity. The method 900 further includes detecting a trigger condition associated with heat dissipation within the electronic device (block 904). In an embodiment without a power constraint, the trigger condition can merely be that the electronic device is operating. In other embodiments, the trigger condition can be a direct or indirect indication of a need for convective cooling. A controller receives the detected trigger condition and controls the at least one actuator to vary the volume of the thermal exchange cavity by deforming the deformable skin (block 906). By varying the volume of the thermal cavity, the actuators cause the exchange of ambient air through the air pores and convectively cool the housing and components of the electronic device. In one embodiment, the controller changes a duty cycle of the at least one actuator to vary the volume of the thermal exchange cavity in response to the detected trigger condition (block 908).

Figure 10:
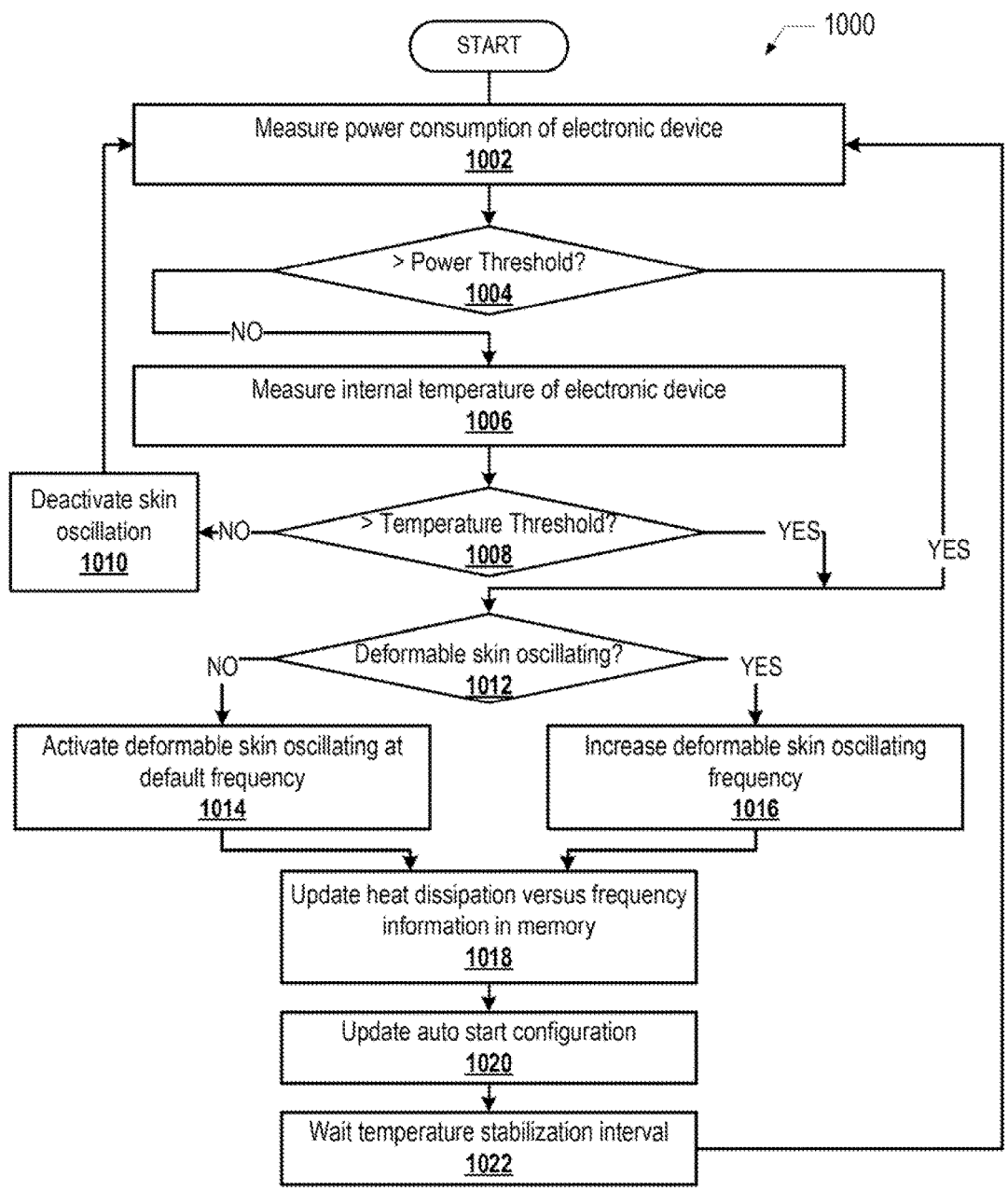
FIG. 10 illustrates a flow diagram of a method of adjusting actuation of the deformable skin to convectively cool the housing of the electronic device, according to one embodiment.

FIG. 10 illustrates a method 1000 for controlling the deformable skin to achieve convective cooling as needed for an electronic device. The method 1000 begins at start block. In one embodiment, the method 1000 includes measuring power consumption of the electronic device as an indirect measurement of thermal energy (block 1002). The controller determines whether the measured power consumption exceeds a power threshold (decision block 1004). In response to a determination in decision block 1004 that the measured power consumption does not exceed the power threshold, the method 1000 includes measuring a temperature value of the electronic device (block 1006). The controller determines whether the measured temperature value exceeds a temperature threshold (decision block 1008). In response to determining that the measured internal temperature value does not exceed the temperature threshold in decision block 1008, the controller deactivates skin oscillation if currently oscillating (block 1010). Then method 1000 returns to block 1002 to continue monitoring for conditions that warrant skin oscillation for convective cooling.

With continued reference to FIG. 10, in response to determining in decision block 1004 that the power consumption of the electronic device exceeds the power threshold, the controller makes a further determination as to whether the deformable skin is oscillating (decision block 1012).

Similarly, in response to determining that the internal temperature of the electronic device exceeds the temperature threshold in decision block 1008, then the controller makes the determination as to whether the deformable skin is oscillating (decision block 1012). In response to the determination that the deformable skin is not oscillating in decision block 1012, then the controller activates the deformable skin to oscillate at a default frequency (block 1014). This default frequency can be a lowest duty cycle. Alternatively, the default frequency can be higher than the lowest duty cycle based upon a current internal measured temperature, current ambient temperature, and/or current power consumption. The default can also be empirically adjusted by past cooling performance for the electronic device. The duty cycle can be in a range of 1 Hz to 20 Hz incremented in 1 Hz steps in order to remain below an audible range. In response to the determination that the deformable skin is oscillating in decision block 1012, then the controller increases the frequency of the oscillation of the deformable skin unless a maximum rate has already been reached (block 1016). After activating at a default frequency in block 1014 or increasing the frequency in block 1016, the method 1000 includes updating heat dissipation versus frequency information in memory (block 1018). The controller or a utility executed by a processor can update an auto start configuration based upon the update (block 1020). The method 1000 can then wait an interval (block 1022), and then return to block 1002 to continue monitoring for a change in condition that can prompt a change in control of convective cooling. As an example, the interval to wait for temperature stabilization at current settings can be one minute, following which a check of the power and/or temperature levels is automatically triggered.

The two illustrated measurements for power consumption and temperature are exemplary. Other measurements can include monitoring performance characteristics of a processor, memory or other components that indicate an elevated power consumption level. In another example, the electronic device can receive communications regarding exterior temperature or have an external temperature sensor. The increased heating due to ambient temperature can serve as an indirect measurement of probable temperature in the interior of the housing. In addition, ambient temperatures can be a basis for lowering a temperature threshold or power consumption threshold in order to mitigate reduced effectiveness of convective cooling.

In each of the flow charts of FIGS. 9-10 presented herein, certain steps of the methods can be combined, performed simultaneously or in a different order, or perhaps omitted, without deviating from the spirit and scope of the described innovation. While the method steps are described and illustrated in a particular sequence, use of a specific sequence of steps is not meant to imply any limitations on the innovation. Changes may be made with regards to the sequence of steps without departing from the spirit or scope of the present innovation. Use of a particular sequence is therefore, not to be taken in a limiting sense, and the scope of the present innovation is defined only by the appended claims.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

Aspects of the present innovation are described below with reference to flowchart illustrations and/or block diagrams of methods, apparatus (systems) and computer programs products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

While the innovation has been described with reference to exemplary embodiments, it will be understood by those skilled in the art that various changes may be made and equivalents may be substituted for elements thereof without departing from the scope of the innovation. In addition, many modifications may be made to adapt a particular system, device or component thereof to the teachings of the innovation without departing from the essential scope thereof Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description, but is not intended to be exhaustive or limited to the innovation in the form disclosed. Many modifications and variations will be apparent to those of ordinary skill in the art without departing from the scope and spirit of the innovation. The embodiment was chosen and described in order to best explain the principles of the innovation and the practical application, and to enable others of ordinary skill in the art to understand the innovation for various embodiments with various modifications as are suited to the particular use contemplated.

What is claimed is:

1. An electronic device comprising:
   a housing;
   at least one actuator attached to the housing;
   a deformable skin having air pores and attached to the at least one actuator;
   a thermal exchange cavity defined by the housing and the deformable skin; and
   a skin oscillation controller contained within the housing and electrically connected to the at least one actuator that varies a volume of the thermal exchange cavity by deforming the deformable skin for exchanging ambient air through the air pores to convectively cool components of the electronic device.

2. The electronic device of claim 1, further comprising a temperature sensor contained in the housing to detect a temperature value, wherein the skin oscillation controller is communicatively coupled to the temperature sensor and changes a duty cycle of the at least one actuator varying the volume of the thermal exchange cavity in response to the temperature value.

3. The electronic device of claim 1, wherein the at least one actuators comprises at least one of a piezoelectric actuator, an electrostatic actuator, a thermal actuator, a pneumatic actuator, an electromechanical actuator, and an electromagnetic actuator.

4. The electronic device of claim 1, wherein the at least one actuator further comprises an electromechanical motor from among a pneumatic motor, a linear motor, and a rotary motor.

5. The electronic device of claim 1, wherein the deformable skin comprises bimetallic material that expands passively in response to a temperature increase.

6. The electronic device of claim 1, wherein the deformable skin comprises 4 mm air pores that are spaced 10 mm from each other.

7. The electronic device of claim 1, wherein deforming the deformable skin comprises causes a deflection of 2 mm at a rate of 2 Hz.

8. The electronic device of claim 1, wherein the deformable skin comprises a thickness of 0.5 mm and has air pores spaced at 10 mm pitch and 4 mm diameter with a pitch to diameter ratio within a range of 2 to 5.

9. The electronic device of claim 1, wherein at least a portion of the housing that is covered by the deformable skin comprises a sealed, thermally conductive material.

10. The electronic device of claim 1, further comprising:
    a power supply contained by the housing and electrically connected to electronic components in the housing;
    a power sensor in electrical communication with one of the power supply and the electronic components to measure a power consumption value; and
    wherein the skin oscillation controller is communicatively coupled to the power sensor and changes a duty cycle of the at least one actuator varying the volume of the thermal exchange cavity in response to the power consumption value.

11. A method comprising:
    detecting a trigger condition associated with heat dissipation within an electronic device having a housing that is covered by a deformable skin having air pores and attached to at least one actuator, wherein a volume between the housing and the deformable skin defines a thermal exchange cavity; and
    controlling the at least one actuators to vary the volume of the thermal exchange cavity by deforming the deformable skin to exchange ambient air through the air pores and convectively cool the housing.

12. The method of claim 11, further comprising:
    detecting a temperature value within the housing; and
    changing a duty cycle of the at least one actuator varying the volume of the thermal exchange cavity in response to the detected temperature value.

13. The method of claim 12, wherein the at least one actuator comprises a selected one of a piezoelectric actuator, an electrostatic actuator, a thermal actuator, a pneumatic actuator, an electromechanical actuator, and an electromagnetic actuator.

14. The method of claim 11, wherein the at least one actuator further comprises an electromechanical motor of a selected one of a pneumatic motor, a linear motor, and a rotary motor.

15. The method of claim 11, wherein the deformable skin comprises bimetallic material to expand passively in response to a temperature increase.

16. The method of claim 11, wherein the deformable skin comprises 4 mm air pores that are spaced 10 mm from each other.

17. The method of claim 11, wherein deforming the deformable skin comprises causes a deflection of 2 mm at a rate of 2 Hz.

18. The method of claim 11, wherein the deformable skin comprises a thickness of 0.5 mm and has air pores spaced at 10 mm pitch and 4 mm diameter with a pitch to diameter ratio within a range of 2 to 5.

19. The method of claim 11, wherein at least a portion of the housing that is covered by the deformable skin comprises a sealed, thermally conductive material.

20. The method of claim 11, further comprising:
   detecting a power consumption value of electronic components within the housing; and
   changing a duty cycle of the at least one actuator varying the volume of the thermal exchange cavity in response to the detected power consumption value.

* * * * *